L. S. CHICHESTER,

Assignor by mesne assignments to G. H. Nichols & C. W. Mills.

GRAIN-DRIER.

No. 7,713. Reissued May 29, 1877.

Inventors.
L. S. Chichester
per to
Geo. H. Nichols
C. W. Mills
By their attorney
Charles E. Foster Attest:
Howard Z. Ely
Fred Benjamin

N. PETERS, PHOTO-LITHOGRAPHER, WASHINGTON, D. C.

UNITED STATES PATENT OFFICE.

LEWIS S. CHICHESTER, OF BROOKLYN, NEW YORK, ASSIGNOR, BY MESNE ASSIGNMENTS, TO GEORGE H. NICHOLS AND CLARK W. MILLS, OF NEW YORK CITY.

IMPROVEMENT IN GRAIN-DRIERS.

Specification forming part of Letters Patent No. 65,793, dated June 18, 1867; reissue No. 7,713, dated May 29, 1877; application filed May 18, 1877.

*To all whom it may concern:*

Be it known that LEWIS S. CHICHESTER, of Brooklyn, Kings county, New York, did invent certain Improvements in Apparatus for Heating and Drying Granular Substances, of which the following is a specification:

The object of this invention is to subject a body of granular material, throughout the entire mass, to the action of heated products of combustion, to directly remove the vapor, gases, and volatile particles eliminated by the heat, and to regulate the heat and to subject the particles to colder currents when necessary; and this is effected by forming surfaces throughout the body of material to be treated, and conducting the heated products of combustion or cold air over said surfaces in currents that pass directly from the material, carrying with them the volatile products.

An improved apparatus used in carrying out the invention is illustrated in the accompanying drawings, in which—

Figure 1:
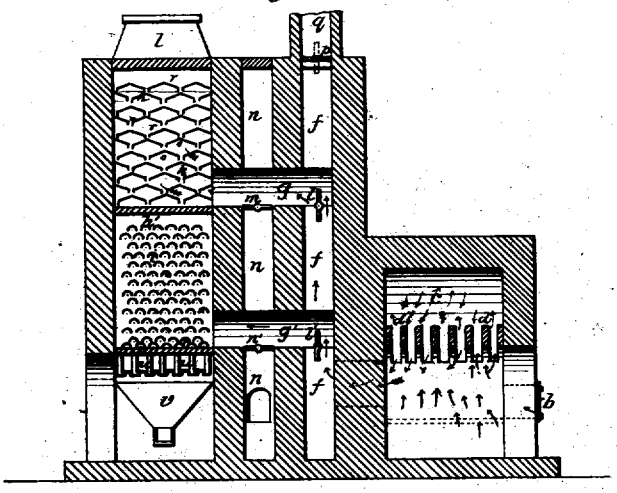
Figure 3:
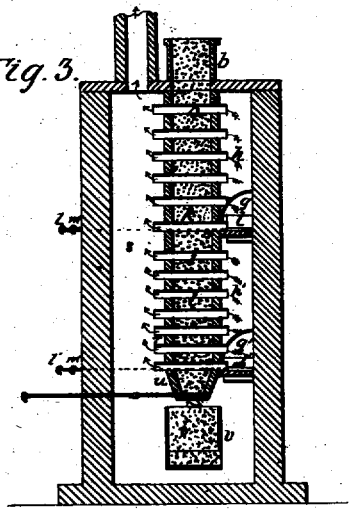
Figure 2:
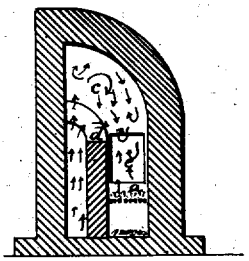

Figure 1 is a vertical section of the improved apparatus. Fig. 2 is a vertical section transversely of the fire-chamber, and Fig. 3 is a vertical section transversely of the receptacle.

Similar marks of reference denote the same parts.

In Letters Patent granted to L. S. Chichester, August 15, 1865, and May 2, 1865, the material to be heated—grain—was passed in thin layers over inclined shelves subjected to the direct contact of heated air or products of combustion. This mode required extensive apparatus, and was necessarily slow, and was objectionable from the failure to carry the volatile products eliminated by the heat directly away from the material. By the present improvement a large body of material may be subjected at one time to the direct action of the heated gases, carrying the volatile products directly from the material, without the use of an apparatus occupying much more space than would be necessary for the storage of material actually treated.

In the drawing, *a* is a fire-chamber, provided with grate-bars, and with a door at *b*, as usual. *c* is an air-heating chamber, adjoining and above the fire, in which are a number of metal bars, *d d*, extending down to the fire, or nearly so; and *e* is the outlet from the air-heating chamber into the flue *f*.

The heater may be made double, with a second fire, and the air-heating chamber *c* between the fires; and the remainder of the apparatus may also be double, having a vertical chamber on each side of the central hot-gas spaces.

Air is either forced into the apparatus or drawn out from the same by suitable blowers or blowing mechanism, and, in passing into the heating-chamber *c*, goes between, and comes into contact with, the heated metal bars *d d*, and thence descends and commingles with the products of combustion, becoming hot and dry, and thence passes to the flue *f*. By this means a large volume of heated gas is obtained, which acts with great efficiency in expelling and carrying off the volatile matters.

*g g'* are hot-gas trunks, connecting the flue *f* with the flues *h h*, that are adjacent to the spaces *k k;* and *l l'* are valves to regulate the inlet of heated gases into the trunks *g g';* and *m m'* are similar valves between the trunks *g g'* and the cold-air space *n;* and *p* is a valve at the upper end of the flue *f*, communicating with a chimney, *q*. By this arrangement of flues and valves the temperature of gases admitted to the heating apparatus can be regulated without depending upon the checking of the fire, and the material can be cooled off by running it through the same apparatus, by air blown through it without being heated. There is no fear, in heating grain, of the same being scorched or baked, because the heat of the gas is entirely under control.

The same means facilitates the cooling off of the material after it has been treated, the valves *g l* being turned to admit the hot gases above, which heat the material, and the valves *g' l'* being adjusted to admit only cold air below, by which the heat is extracted before the material leaves the shaft.

The chambers or receptacles *k* for the material are formed by the vertical plaes *r r* and on one side are the hot-gas flues *h h*, and on the other side the escape flue or chamber *s*.

The half-pipes forming the air passage-ways are made of metal or other suitable material, and pass into and through the plates *r r*. The convex side of the half-tube is upward, and the plates *r* are removed beneath the ends of the said half-tubes, so as to form openings for the gases to pass freely through. The gases, in passing into contact with the upper portions of the material, convey away the volatile products, and also, by passing beneath the half-pipes, heat the material above.

These half-pipes may be of any desired size, number, or shape, semi-cylindrical pipes being shown at *i i*, and prismatic or inverted trough-shaped half-pipes at *o o*.

The apparatus is kept full of material from the hopper *t*, and the troughs *u u* conduct the same into the hopper *v*. The time that the material takes to pass through the apparatus depends upon the speed with which it is allowed to run away at the lower part of the drier; and by this means the extent of the heating operation may be regulated according to circumstances.

What is claimed, and desired to be secured by Letters Patent, as the invention of said CHICHESTER, is—

1. The combination of the chamber or receptacle *k* and the inverted troughs extending across the chamber, and communicating at the inner ends with passages leading from a fire-place, and at the opposite ends with a flue or chamber, *s*, whereby the heated gases are passed directly over surfaces formed in the body of the material, and the volatile products are carried directly from the material to the chamber *s*, substantially as specified.

2. The combination, with the shaft or chamber *k* and its transverse troughs, of passages arranged to conduct cold air through the lower series of tubes, substantially as set forth.

3. The chamber above the fire, combined with the inlets for admitting air in large volumes, that it may descend and mingle with the products of combustion, and pass with the same into the shaft or chamber *k*, substantially as and for the purposes specified.

4. The arrangement of the hot and cold air flues *f n*, trunks *g* or *g'*, and valves *l l'* and *m m'*, for regulating the temperature of the air passing into the chamber *k*, substantially as specified.

5. A series of half-pipes crossing the chamber *k*, and opening at or near both ends into chambers or flues, as set forth.

In testimony whereof we have signed our names to this specification in the presence of two subscribing witnesses.

GEORGE H. NICHOLS.
C. W. MILLS.

Witnesses:
WYLLY HODGES,
CHARLES H. PREYER.